(12) United States Patent
Hutson et al.

(10) Patent No.: US 8,012,438 B2
(45) Date of Patent: Sep. 6, 2011

(54) WET SCRUBBER ADDITIVE FOR SIMULTANEOUS REMOVAL OF OXIDES AND METALS FROM A GAS

(75) Inventors: Nick D. Hutson, Durham, NC (US); Ravi K. Srivastava, Cary, NC (US); Renata Krzyzynska, Wroclaw (PL); Yongxin Zhao, Cary, NC (US)

(73) Assignee: The United States of America as represented by the Administrator of the U.S. Environmental Protection Agency, Washington, DC (US)

( * ) Notice: Subject to any disclaimer, the term of this patent is extended or adjusted under 35 U.S.C. 154(b) by 0 days.

(21) Appl. No.: 12/457,955

(22) Filed: Jun. 25, 2009

(65) Prior Publication Data

US 2010/0329955 A1    Dec. 30, 2010

(51) Int. Cl.
*B01D 53/50* (2006.01)
*B01D 53/64* (2006.01)
*B01D 53/74* (2006.01)

(52) U.S. Cl. .......... 423/210; 423/235; 423/243.01; 423/243.08; 422/168

(58) Field of Classification Search .......... 423/210, 423/235, 243.01, 243.08; 422/168; 252/182.11, 252/182.32, 183.11, 183.14, 183.16
See application file for complete search history.

(56) References Cited

U.S. PATENT DOCUMENTS

| | | | | |
|---|---|---|---|---|
| 3,923,955 | A | * | 12/1975 | Fattinger .......... 423/210 |
| 4,025,603 | A | * | 5/1977 | Shibata et al. .......... 423/239.1 |
| 4,426,364 | A | | 1/1984 | Cooper |
| 4,460,552 | A | * | 7/1984 | Zakrzewski .......... 423/210 |
| 5,238,488 | A | | 8/1993 | Wilhelm |
| 5,328,673 | A | * | 7/1994 | Kaczur et al. .......... 423/235 |
| 5,637,282 | A | * | 6/1997 | Osborne et al. .......... 423/235 |
| 5,900,042 | A | | 5/1999 | Mendelsohn et al. |
| 6,878,358 | B2 | | 4/2005 | Vosteen et al. |
| 7,048,899 | B2 | * | 5/2006 | Alix et al. .......... 423/235 |
| 7,252,986 | B2 | | 8/2007 | Davis-Hoover et al. |
| 7,381,378 | B2 | | 6/2008 | McWhorter |
| 2002/0114749 | A1 | | 8/2002 | Cole |
| 2002/0114750 | A1 | | 8/2002 | Holste et al. |
| 2005/0214187 | A1 | * | 9/2005 | Johnson .......... 423/235 |
| 2006/0239877 | A1 | * | 10/2006 | Johnson et al. .......... 423/210 |

FOREIGN PATENT DOCUMENTS

DE    33 26 832 A1  *  2/1985

OTHER PUBLICATIONS

Yang et al., Aqueous Absorption of Nitric Oxide Induced by Sodium Chlorite Oxidation in the Presence of Sulfur Dioxide, Environmental Progress, vol. 17, No. 2, 1998, 80-85.
Adewuyi et al., Simultaneous Absorption and Oxidation of NO and $SO_2$ by Aqueous Solutions of Sodium Chlorite, Chem. Eng. Comm., 1999, vol. 174, 1999, 21-51. Chien et al., Removal of $SO_2$ and NO from flue gas by wet scrubbing using an aqueous $NaClO_2$ solution, Journal of Hazardous Materials B80, 2000, 43-57.
Chu et al., The absorption kinectics of NO in $NaClO_2$/NaOH solutions, Journal of Hazardous Materials B84, 2001, 241-252.
Sada et al., Absorption of NO in Aqueous Mixed Solutions of $NaClO_2$ and NaOH, Chemical Engineering Science, vol. 33, 1978, 315-318.

* cited by examiner

*Primary Examiner* — Timothy C Vanoy
(74) *Attorney, Agent, or Firm* — Bacon & Thomas PLLC; George Loud

(57) ABSTRACT

A method for controlling multipollutant (e.g., $SO_2$, $NO_x$, $Hg^0$ and $Hg^{2+}$) emissions from a gas stream of a stationary combustion source, an apparatus for controlling multipollutant emissions, and a wet scrubber additive composition for controlling multipollutant emissions are disclosed.

19 Claims, 10 Drawing Sheets

WET SCRUBBER ADDITIVE FOR SIMULTANEOUS REMOVAL OF OXIDES AND METALS FROM A GAS

BACKGROUND

The Environmental Protection Agency (EPA) issued the Clean Air Interstate Rule (CAIR) on Mar. 10, 2005, to reduce sulfur dioxide ($SO_2$) and nitrogen oxide ($NO_X$) emissions in the eastern United States. $SO_2$ and NOx both contribute to the formation of fine particles (PM). In addition, NOx contributes to the formation of ground-level ozone. Fine particles and ozone are associated with thousands of premature deaths and illnesses each year. Additionally, these pollutants reduce visibility and damage sensitive ecosystems. Srivastava, R. K.; Hutson, N. D.; Martin, G. B.; Princiotta, F.; Staudt, J.; Control of Mercury Emissions from Coal-fired Electric Utility Boilers, *Environ. Sci. Technol.*, 2006, 41, 1385.

Power plants are a major source of $SO_2$ and $NO_x$ emissions. A number of power plants use wet flue gas desulfurization (FGD) technologies, particularly limestone-based wet scrubbers, to control $SO_2$ emissions. In 2005, it was estimated that approximately one-third of U.S. coal-fired utility capacity employed some type of FGD technology. About 86% of those systems are wet-scrubber based and almost 70% of those wet scrubbers use a limestone process. Hutson, N. D.; Mercury Capture on Fly Ash and Sorbents: The Effects of Coal Properties and Combustion Conditions, *Water, Air & Soil Poll: Focus*, 2008, 8, 323.

Removal of $SO_2$ from flue gas using a limestone process takes place in the scrubber as follows:

(1)

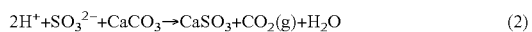
(2)

And, assuming there is an adequate supply of oxygen (air), the calcium sulfite may be then be oxidized to calcium sulfate (gypsum) as follows:

(3)

Emissions of nitrogen oxides ($NO_X$) in the U. S. are largely controlled by combustion controls (e.g., low-$NO_X$ burners, staged combustion) and selective catalytic reduction (SCR) or selective non-catalytic reduction (SNCR) technologies. As mentioned earlier, CAIR also mandates additional reductions in $NO_X$ emissions. As a result, it is predicted that the use of selective catalytic reduction (SCR) systems will significantly increase and will be used on slightly more than 50% of the total coal-firing power plants by 2020.

The EPA has also suggested a regulatory approach for the control of mercury (Hg) emissions from coal-fired power plants. Hg is a hazardous air pollutant (HAP) that poses serious health concerns due to its ability to bioaccumulate in the food chain—mainly in fish. There are both natural and anthropogenic sources of Hg emissions to the atmosphere. Of the anthropogenic sources, coal-fired utility boilers are believed to be the largest uncontrolled domestic source, accounting for about 48 tons in 1999. Srivastava, R. K.; Hutson, N. D.; Martin, G. B.; Princiotta, F.; Staudt, J.; Control of Mercury Emissions from Coal-fired Electric Utility Boilers, *Environ. Sci. Technol.*, 2006, 41, 1385.

To date, wet-FGD scrubbers have been designed to specifically remove $SO_2$ and NOx from flue gas. However, under the appropriate conditions, wet-FGD scrubbers can also remove soluble forms of other pollutants such as Hg. Proposals have involved Hg emission reductions through a combination of mercury-specific control technologies and "co-benefit" (or multi-pollutant) control technologies. Co-benefit reductions are those occurring via control technologies that are installed for other pollutants (e.g., PM, $SO_2$, $NO_X$) rather than specifically for mercury. However, deeper emission limits will likely require the use of additional Hg-specific control technologies. Wet-FGD scrubbers have the potential to provide a high level of Hg control because of their substantial gas-liquid mass transfer and the high solubility of most oxidized Hg compounds (such as $HgCl_2$). However, this control is only effective for flue gas streams containing oxidized forms of Hg. The elemental form is not soluble and tends to pass through the wet scrubber. Srivastava, R. K.; Hutson, N. D.; Martin, G. B.; Princiotta, F.; Staudt, J.; Control of Mercury Emissions from Coal-fired Electric Utility Boilers, *Environ. Sci. Technol.*, 2006, 41, 1385.

In general, facilities that burn coals with higher chlorine content (as often seen in eastern bituminous coals) tend to produce more oxidized Hg. Conversely, facilities that utilize coals with lower chlorine content (e.g., western sub-bituminous coals) tend to produce flue gases containing mostly elemental Hg. Additional equipment is needed to scrub flue gases that contain mostly elemental Hg.

Thus, while there are technologies available that successfully control the emission of an individual pollutant from a gas stream, a need exists for a cost-effective technology that can control multipollutant (e.g., $SO_2$, $NO_X$, $Hg^0$ and $Hg^{2+}$) vapor emissions from a gas stream obtained from of a stationary combustion source.

SUMMARY

The present invention relates to a method for controlling multipollutant (e.g., $SO_2$, $NO_X$, $Hg^0$ and $Hg^{2+}$) emissions from a gas stream of a stationary combustion source, an apparatus for scrubbing a gas, and a wet scrubber additive composition for scrubbing a gas.

A first embodiment of the present invention relates to a process for scrubbing a gas containing $SO_2$ and at least one pollutant selected from the group consisting of NO, $NO_2$, Hg vapor, and a mixture thereof, by contacting the gas stream with an alkaline slurry and oxidizing agent in a contact zone to scrub the $SO_2$ and at least one other pollutant from the gas.

A second embodiment is an apparatus for scrubbing a gas comprising $SO_2$ and at least one pollutant selected from the group consisting of NO, $NO_2$, Hg vapor, and a mixture thereof, comprising a holding tank for an alkaline slurry; a holding tank for an aqueous solution of an oxidizing agent; spray tower having one or more contact zones; one or more alkaline slurry introduction points; one or more oxidizing agent introduction points, wherein the alkaline slurry introduction points and the oxidizing agent introduction points are positioned so that the gas stream is contacted with the alkaline slurry and oxidizing agent to obtain a reacted gas; and an exhaust downstream from the contact zone for releasing the scrubbed gas.

A third embodiment is a wet scrubber additive composition for scrubbing a gas comprising $SO_2$ and at least one other pollutant comprising an alkaline slurry and an oxidizing agent to remove $SO_2$ and at least one other pollutant.

DETAILED DESCRIPTION

Figure 1:
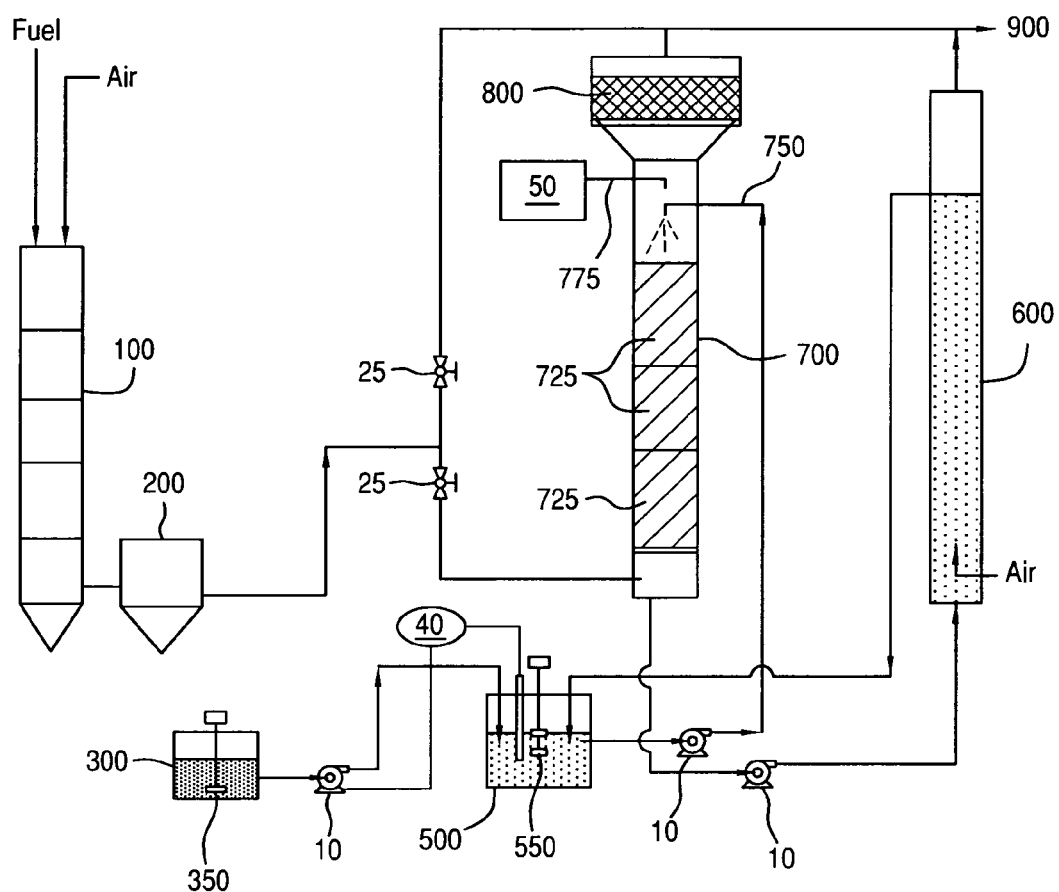
FIG. 1 is schematic view of an example apparatus for implementation of the present invention.

We turn now to the first embodiment.

A first embodiment of the present invention relates to a process for removing $SO_2$, and at least one other pollutant from a gas stream by contacting the gas stream with an alkaline slurry and an oxidizing agent solution to scrub the pollutants from the gas stream. The multipollutant capacity of a gas scrubbing device is enhanced when a gas stream containing multiple pollutants is contacted with both an alkaline slurry and oxidizing agent.

$SO_2$ is often an abundant pollutant in a multipollutant gas stream. Applicants do not want to be bound by any particular theory but it is believed that by properly contacting a gas stream containing multipollutants with an alkaline slurry and an oxidizing agent solution, the alkaline slurry reacts with $SO_2$ to allow the oxidizing agent to react with other pollutants present in the gas stream, thus allowing them to be more easily removed in the scrubber.

For example, when a gas stream containing $SO_2$ and at least one other pollutant is contacted with a calcium carbonate slurry (i.e., an alkaline slurry) and a $NaClO_2$ solution (i.e., an oxidizing agent) in a FGD scrubber, $NaClO_2$ reacts with gaseous NO to form a more soluble nitrogen containing compound such as $NO_2$ (or maybe even higher oxidation state forms such as $N_2O_5$), which is more easily removed in the FGD scrubber. The $NaClO_2$ additive also reacts with elemental Hg vapor ($Hg^0$) in a gas stream to form a more soluble ionic form ($Hg^{2+}$), which may be more easily removed in the slurry or adsorbed onto solids present in a FGD scrubber.

The reaction of NO and $NaClO_2$, in an alkaline solution, is believed to be as follows:

$$2NO + ClO_2^- \rightarrow 2NO_2 + Cl^- \quad (4)$$

$$4NO_2(g) + ClO_2^- + 4OH^- \rightarrow 4NO_3^- + Cl^- + 2H_2O \quad (5)$$

Or under acidic conditions as follows:

$$4NO(g) + 3ClO_2^- + 2H_2O \rightarrow 4HNO_3 + 3Cl^- \quad (6)$$

The reaction of $Hg^0$ with $NaClO_2$ solution is believed to be as follows:

$$2Hg^0(g) + ClO_2^- + 2H_2O \rightarrow 2Hg^{2+} + 4OH^- + C^- \quad (7)$$

In one facet of this embodiment, the gas stream is a gas from a stationary combustion source. A stationary combustion source is any device that results in the emission of a gas stream containing $SO_2$ and at least one other pollutant. Examples of stationary combustion sources that emit a gas stream that can be treated in accordance with this embodiment are power plants, manufacturing facilities, waste incinerators, fireplaces, ovens, boilers, smelters, furnaces, or steam generators. The fuel used in the stationary combustion source can vary. For example, the fuel can be coal, waste coal, or a sulfur-containing fossil fuel.

In another facet of the embodiment, the gas stream is contacted with the alkaline slurry and the oxidizing agent within a device for conveying exhaust gases from a stationary combustion source. Examples of a device for conveying exhaust gases include flues, ducts, and pipes.

In addition to $SO_2$, at least one other pollutant is removed from the gas stream. NO, $NO_2$, Hg vapor (e.g., oxidized or elemental Hg vapor), hydrochloric acid, hydrofluoric acid, toxic metals (e.g., lead, cadmium, arsenic, and selenium), ammonia, and mixture thereofs are also capable of being removed from a gas stream. In one aspect of this invention, the at least one other pollutant is selected from the group consisting of NO, $NO_2$, Hg vapor, and a mixture thereof. In yet a further aspect of this embodiment, the pollutants $SO_2$, NO, $NO_2$, and Hg vapor are each removed from a gas stream containing such pollutants.

The amount of pollutant removed from a gas stream will vary depending on the amount of each pollutant that was initially present in the gas stream. The amount of pollutant initially present in the gas stream will somewhat vary depending on the type of stationary combustion source and fuel that has been used to generate the gas stream. For example, 40-100% of $SO_2$, 5-95%, NO, 5-95% $NO_2$, and 5-95% of Hg vapor can be removed from a gas stream initially containing SO2, NO, $NO_2$, and Hg vapor.

A feature of this embodiment is that $SO_2$ and the at least one other pollutant are simultaneously removed from a gas stream containing multipollutants meaning that no additional devices or methods are needed to reduce the amount $SO_2$ and the at least one other pollutant present in the gas stream to acceptable levels. The order in which $SO_2$ and the at least one other pollutant are removed from the gas stream may slightly vary depending on the manner in which the chemical reactions discussed above take place.

In one facet of this embodiment, the alkaline slurry is an aqueous slurry of an alkaline or alkaline earth hydroxide, an alkaline earth oxide, an alkaline or alkaline earth carbonate, lime (CaO), limestone, calcium carbonate ($CaCO_3$), or mixtures thereof. The alkaline slurry is preferably limestone or calcium carbonate.

In yet another facet of this embodiment, the oxidizing agent used in accordance with the claimed invention is an aqueous solution selected from the group consisting of water soluble oxidizing salts, water soluble halide containing salts, $NaClO_2$, $NaClO_3$, $H_2O_2$, $KMnO_4$, $Ca(OCl)_2$, and mixtures thereof. The oxidizing agent is preferably $NaClO_2$.

The alkaline slurry and oxidizing agent are combined to form a scrubbing solution and then the scrubbing solution is contacted with the gas stream. Alternatively, the alkaline slurry and oxidizing agent are contacted with the gas stream at different times so that the alkaline slurry contacts the gas stream first.

In one facet of this embodiment, the process for removing $SO_2$, and at least one other pollutant from a gas stream is utilized in conjunction with a pre-existing technology for treating a gas stream containing pollutants. For example, the method can be practiced with a flue gas desulfurization (FGD) apparatus. FGD is a process used for removing sulfur dioxide ($SO_2$) from exhaust flue gases in power plants that typically burn coal or oil to produce steam for the steam turbines that drive their electricity generators. FGD systems that can be used in accordance with the present invention include wet scrubbing systems and dry injection or spray drying operations. A wet FGD system used in accordance with the present invention is selected from the group consisting of a spray tower, venturis, plate tower, and a mobile packed bed. The configuration of the FGD system itself may be vertical or horizontal, and a gas stream can flow concurrently, countercurrently, or crosscurrently with respect to the liquid.

We turn now to the second embodiment.

FIG. 1 is a schematic view of an example apparatus for implementation of the present invention. Air and a fuel, such as coal, is introduced into a stationary combustion source (100) to produce a gas stream containing $SO_2$ and at least one other pollutant. The gas stream passes through a bag house (200) to remove particulate matter and dust contained in the gas stream. The gas stream then proceeds to the spray tower (700). The direction of the gas stream in the apparatus is optionally controlled by a series of gas valves (25).

The spray tower (700), where $SO_2$ and the other pollutants are scrubbed, contains one or more slurry-gas contact zones (725), and preferably contains multiple contact zones (725). The contact zones (725) are the areas in which the alkaline slurry and oxidizing agent contact the gas stream as the gas stream proceeds along the spray tower (700).

The oxidizing agent solution is held in an oxidizing agent tank (50) and introduced into the spray tower (700) via an one or more oxidizing agent introduction points (775). The spray tower (700) can have one or more, and preferably has multiple oxidizing agent introduction points (775). The one or more oxidizing agent introduction points (775) have a device, such as a pump or sprayer, to introduce the alkaline slurry into the spray tower. In one aspect of this embodiment, the pump or sprayer introduces the alkaline slurry in a manner that evenly distributes the alkaline slurry upon delivery and throughout the spray tower (e.g, vertically and horizontally).

A make-up tank (300) initially holds the alkaline slurry. The alkaline slurry is stirred during operation with a stirrer (350) and pumped to an alkaline slurry tank (500) via a pump (10). A pH control device (40) monitors the pH of the alkaline slurry tank (500) and controls the amount of alkaline slurry being added to the alkaline slurry tank (350) based on the desired pH of the alkaline slurry tank (500). The alkaline slurry is stirred during operation of the apparatus with a stirrer (550) while in the slurry tank and then pumped to the spray tower (700). The alkaline slurry is introduced into the spray tower (700) via one or more alkaline slurry introduction points (750). The one or more alkaline slurry introduction points (750) have a device such as a pump or sprayer to introduce the alkaline slurry into the spray tower. In one aspect of this embodiment, the pump or sprayer introduces the alkaline slurry in a manner that evenly distributes the alkaline slurry upon delivery and throughout the spray tower (700) (e.g, vertically and horizontally).

As the gas stream proceeds up the spray tower, the oxidizing agent and alkaline slurry are introduced into the spray at their respective introduction points (775 and 750, respectively) so that oxidizing agent and alkaline slurry proceed through the spray tower and come into contact with the multipollutant containing gas stream in one or more of the contact zones (725).

Each contact zone (725) optionally contains a material that facilitates the gas-liquid contact and enhances the scrubbing of the $SO_2$ and other pollutants from the gas stream. For example, the contact zones optionally contain plastic hollow balls (e.g., 2-cm in diameter) which are supported by a grid at the bottom of each contact zone. The hollow balls, fluidized by the upward gas stream, facilitate slurry turbulence and promote intimate contact between the gas stream and scrubbing slurry to improve the pollutant removal efficiencies. Other typical mass transfer column packing (e.g., Rachig rings, saddle rings, etc.) or other scrubber designs (e.g., bubble plate, sieve plate) may also be employed.

Once the gas has been scrubbed of the multipollutants, the gas stream exits the spray tower (700) optionally via a demister (800) to reduce emission of mists and aerosols in the scrubbed gas stream. The cleaned gas stream then passes through the exhaust (900) of the wet scrubber system.

The spent oxidizing agent and alkaline slurry that has come into contact with the gas stream containing multipollutants is fed to an oxidation tower (600). Air is introduced into the oxidation tower along with the spent alkaline slurry and the reaction products from the oxidizing agent reactions. This process is typically referred to as a "forced oxidation process" or as a scrubber operating in "forced oxidation mode". The purpose of the oxidation tower is to effectively oxidize calcium sulfite ($CaSO_3$) to calcium sulfate ($CaSO_4$, gypsum—see Reaction (3) above). The spent resultant $CaSO_4$ slurry is then returned to alkaline slurry tank (500). At steady-state operation the slurry hold tank (500) will contain a slurry of $CaSO_4$ and $CaCO_3$. Additional $CaCO_3$ slurry from the make-up tank (300) is added to the slurry hold tank (500) to maintain the desired pH of the slurry hold tank (500) contents.

In FIG. 1, the oxidizing agent solution and the alkaline slurry have separate introduction points at different locations within the spray tower. One facet of this embodiment is that the oxidizing agent solution is introduced in a location such that, upon introduction, it contacts the gas stream after the gas stream has already contacted the alkaline slurry.

Figure 2:
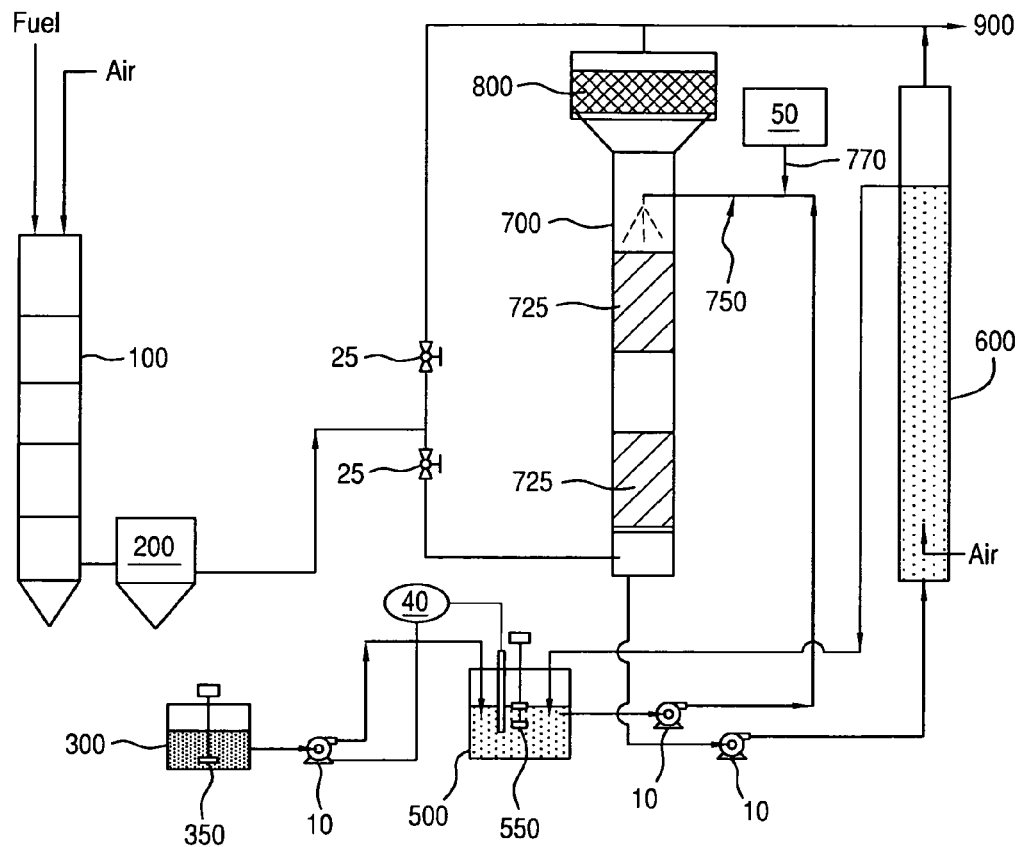
FIG. 2 is schematic view of an example apparatus with an alternative implementation of the present invention.

In yet another facet of this embodiment, FIG. 2 shows that the oxidizing agent introduction point (775) and alkaline slurry introduction point (750) are the same. When the oxidizing agent and the alkaline slurry are introduced into the spray tower (700) at the same location, the oxidizing agent solution and alkaline slurry are mixed together prior to their introduction into the spray tower (700) or introduced into the spray tower (700) at the same location but at different intervals.

In yet another aspect of this embodiment, the present invention relates to a plant containing an apparatus of the present invention. A plant is a building or group of buildings containing equipment for the manufacture of a product. Example of plants in accordance with the present invention are coal-burning plants, cement processing plants, taconite processing plants, plants having a medical waste incinerator, plants having a municipal waste combustor and metal production/smelting plants.

The features of the first embodiment as discussed above can be used combination with this embodiment.

We turn now to the third embodiment.

A third embodiment is a wet scrubber additive composition for scrubbing a gas stream comprising $SO_2$ and at least one pollutant selected from the group consisting of NO, $NO_2$, Hg vapor, and mixture thereof. The wet scrubber additive composition comprises an alkaline slurry and oxidizing agent in amounts sufficient to remove $SO_2$ and at least one pollutant selected from the group consisting of NO, $NO_2$, Hg vapor or a mixture thereof from the gas stream.

In one aspect of this embodiment, the oxidizing agent is an aqueous solution selected from the group consisting of water soluble oxidizing salts, water soluble halide containing salts, $NaClO_2$, $NaCO_3$, $H_2O_2$, $KMnO_4$, and $Ca(OCl)_2$. The oxidizing agent is optionally an aqueous solution of $NaClO_2$.

In yet another aspect, the alkaline slurry is an aqueous slurry of an alkaline or alkaline earth hydroxide, alkaline or alkaline earth oxide, alkaline or alkaline earth carbonate, lime, limestone, calcium carbonate, or mixtures thereof. The alkaline slurry is preferably limestone, or calcium carbonate.

A feature of this embodiment is a wet scrubber additive composition comprising $NaClO_2$ and calcium carbonate in amounts sufficient to remove $SO_2$ and at least one pollutant selected from the group consisting of NO, $NO_2$ and Hg vapor from the gas stream. In yet another feature, the composition is in contact with a gas containing $SO_2$ and at least one pollutant selected from the group consisting of NOx, $Hg^0$ vapor, or mixtures thereof.

The foregoing description of the invention has been presented describing certain operable and preferred embodiments. It is not intended that the invention should be so limited since variations and modifications thereof will be obvious to those skilled in the art, all of which are within the spirit and scope of the invention.

The features of the first and second embodiments as discussed above can be used combination with this embodiment.

Background and working example for the invention are set forth below.

BACKGROUND OF EXAMPLES 1-4

A flow-through gas-liquid impinger was used to simulate a wet FGD scrubber system. The system included a gas blending system for providing a synthetic flue gas, the flow-through gas-liquid impinger, and on-line gas analyzers for measurement of the gases of interest. The scrubber slurry was pumped into the impinger which overflowed to maintain a constant slurry level and volume of approximately 380 mL. The scrubber temperature was maintained at 55° C. by immersing the scrubber, to the overflow, in a controlled temperature water bath. Oxidant and a calcium carbonate (ACS grade) solution were blended together prior to introduction to the scrubber using peristaltic pumps and introduced into contact zone at the same location. The addition rate of the oxidant solution was monitored via weight loss in the beaker. The alkali solution addition rate was monitored via the weight gain from the overflow of the scrubber. The alkali scrubber solution was constantly mixed to ensure a homogeneous 10 wt % solids slurry. Oxidants $NaClO_2$, $H_2O_2$, $KMnO_4$, and $Ca(OCl)_2$ were studied.

Simulated flue gas was generated from a controlled mixture of cylinder gases. Mass flow controllers and valves were used to control the flow of the component gases to provide a standard simulated flue gas comprised of approximately 81 vol % $N_2$, 11 vol % $CO_2$, 8% $O_2$, 1500 ppmv $SO_2$, 200 ppmv NO and 206 µg/m³ $Hg^0$. The total flow of the simulated flue gas was 2 L/min (STP). $Hg^0$ vapor was supplied using a VICI Metronics Dynacalibrator permeation oven held at 100° C. and using $N_2$ as the carrier gas. The Hg concentration was 10 times higher than is typical for a coal combustion flue gas to accommodate the sensitivity of the Hg analyzer. The $SO_2$ concentration was varied from 0-2500 ppm and the NO concentration was varied from 0-470 ppm.

The exhaust from the impinger passed through a mini-impinger containing quartz wool to remove any water mist prior to analysis. The scrubbed gas then passed through heat traced lines to a Nafion dryer which removed remaining any remaining water vapor. A gas sample was then pulled through a series of analyzers while the excess gas is vented to the hood. The $NO_X$ species were measured using a continuous chemiluminescence $NO_X$ analyzer (API Model 200AH). The $SO_2$ was measured using a continuous fluorescence analyzer (API Model 100AH).

Figure 3:
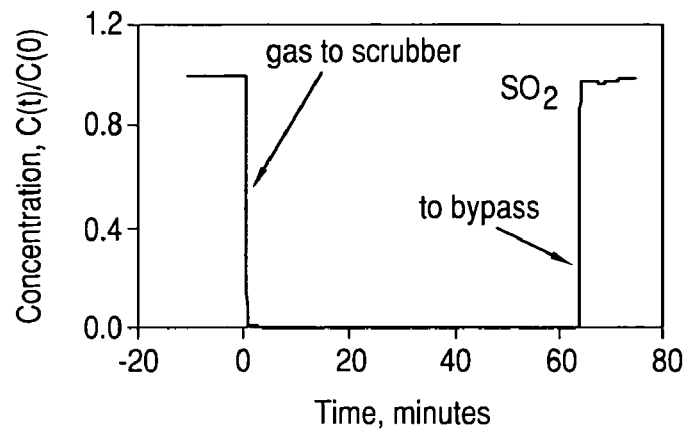
FIGS. 3-5 are graphs showing a concentration profile for various pollutants in a flue gas treated in accordance with the present invention.
Figure 4:
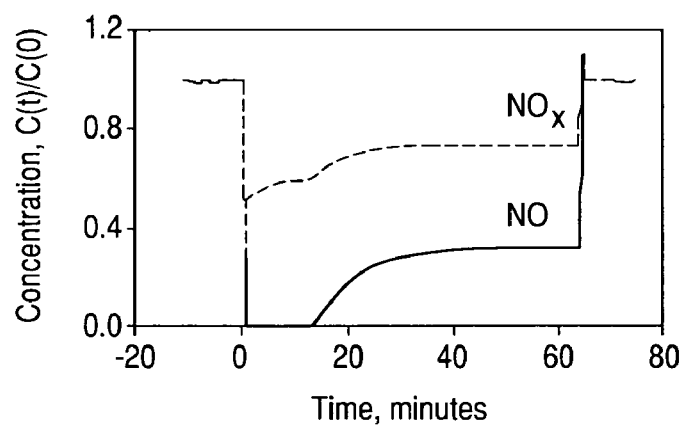
Figure 5:
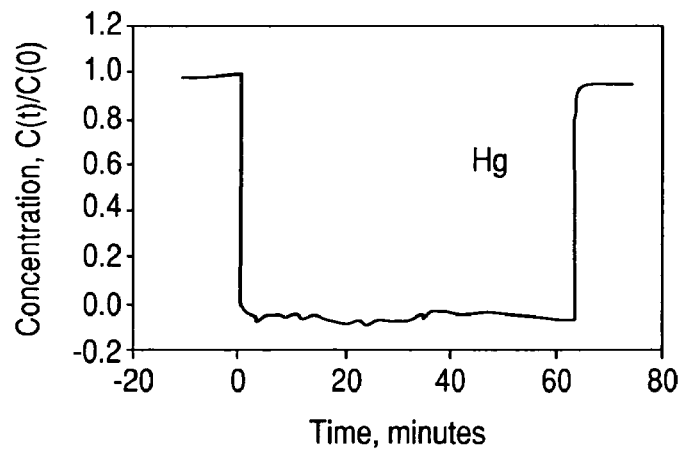

$Hg^0$ vapor was measured using a continuous cold vapor atomic absorption (CVAA) analyzer (BUCK Model 400A). This instrument uses atomic absorption to quantify elemental Hg by producing an output signal between 0 and 250 mV that is proportional to the concentration. Both water and $SO_2$ interfere with Hg measurement by absorbing light at the wavelength being measured. Water was eliminated from the sample with the in-line Permapure Nafion dryer. $SO_2$ was an integral part of the flue gas being tested and it produces a CVAA signal proportional to the $SO_2$ concentration. The $SO_2$ concentration was determined using the same sample stream as analyzed for Hg concentration (i.e., the $SO_2$ analyzer was installed in series, downstream of the CVAA analyzer. The CVAA response to $SO_2$ was determined daily and the Hg concentrations are subsequently corrected for $SO_2$ interference. To prevent long-term instrument drift, the sample cell from the CVAA analyzer was removed, soaked in a 10% nitric acid solution for at least 4 hours, rinsed and dried between each experiment. All analyzer results were automatically logged to a data acquisition system every 10 seconds. An example concentration profile, in this case for $NaClO_2$ added at a concentration of 2.5 mM in the $CaCO_3$ slurry (see FIGS. 3-5). The initial concentration of Hg in the scrubber inlet was 206 µg/m3. Initial concentrations of NO and SO2 were 200 ppm and 1500 ppm, respectively.

A summary of experimental conditions for the bench scale tests is given in Table 1.

TABLE 1

SUMMARY OF EXPERIMENTAL CONDITIONS

| Experimental Condition | Value | Remark |
|---|---|---|
| $SO_2$ | 0-2500 ppm | $SO_2$ in nitrogen |
| NO | 0-470 ppm | NO in nitrogen |
| $CO_2$ | 11 vol % | Compressed $CO_2$ |
| $O_2$ | 8 vol % | Compressed air ($N_2/O_2$) |
| $N_2$ | balance | Compressed $N_2$, air, other |
| $Hg^0$ | 206 µg/m³ | $Hg^0$ permeation tube at 100° C. |
| Total flue gas flow | 2 L/min | Std conditions, 1 atm and 20° C. |
| Scrubber slurry solids wt % | 10 wt % | alkali and oxidant solutions combined |
| Scrubber slurry addition rate | 550 g/hr | alkali and oxidant solutions combined |
| Oxidant concentration | varied | type and concentration varied |
| Scrubber temperature | 55° C. | controlled by water bath |
| Mean residence time | 0.76 hr | Slurry residence time |
| L/G | 4.17 | Liquid-to-Gas Ratio |

The experiments were conducted by allowing the impinger to fill to overflowing while the simulated flue gas stream bypassed the system. The flue gas was then introduced to the impinger and scrubbed for 60 minutes. This time was inadequate to allow the scrubber liquor to reach steady-state. The scrubber vessel was based on a continuously stirred tank reactor (CSTR). Using the CSTR model, it was predicted that added components in the slurry were at 73% of their steady state value at the end of the 60 minute experiments. These predicted values were used in scrubber mass balance calculations. The fresh oxidant/CaCO₃ slurry was added at a consistent rate during the scrubbing period. The scrubber effluent was collected in a glass sample bottle during a timed 10 minute interval near the end of the 60 minute scrubber operation. The sample was immediately weighed and it was placed on ice to quench or slow any oxidation reactions. The sample was then analyzed as soon as practical for chloride, sulfate, nitrate, and nitrite by ion chromatography (IC) using EPA reference method 300.0. The sample was also analyzed for total Hg content. The samples were prepared for Hg analysis by aliquoting 10 ml of the solids slurry into digestion tubes and digesting according to ASTM Method D6784-02 (Ontario Hydro) as described for the potassium chloride fraction. Hg analysis of each digest was carried out by CVAA according to EPA SW846 Method 7470A "Mercury in Liquid Waste (Manual Cold Vapor Technique)." A Perkin Elmer FIMS 100 Flow Injection Mercury System was used for this analysis.

The instrument was calibrated with known standards ranging from 0.025 to 1 μg/L Hg for low range sample and with known standards ranging from 0.25 to 10.0 μg/L for high range samples. The method detection limit for Hg in aqueous samples is 0.01 μg/L. Samples with known additions of Hg for analytical spikes also were digested as described above prior to CVAA analysis. A second independent sample was also collected in a glass beaker for measurement of final pH.

Example 1

Blank tests were conducted using only a de-ionized water solution—with no oxidizer and or alkali sorbent added. These tests showed approximately no removal of $Hg^0$ vapor, less than 2% removal of $NO_X$, and about 24% removal of $SO_2$. Baseline tests were conducted with a 10-wt % $CaCO_3$ slurry with no added oxidizing agent. These tests again showed no removal of $Hg^0$ vapor and minimal $NO_X$ removal with nearly 100% removal of $SO_2$. Different slurry concentrations of $CaCO_3$ were also tested—from 0.5-wt % up to 10-wt %—in order to see the influence of $CaCO_3$ concentration on pollutant removal.

Initial oxidant screening tests were conducted with a variety of water-soluble oxidants. These oxidants and the percent removal of each of the pollutants of interest are given in Table 2.

TABLE 2

REMOVAL OF POLLUTANTS (% AT 1 HR) IN BENCH-SCALE TESTS USING OXIDANT ADDITIVES OTHER THAN $NACLO_2$

| Oxidant | Oxidant [mM]* | Pollutant Removal (% at 1 hr) | | | |
|---|---|---|---|---|---|
| | | $SO_2$ | $NO_X$ | NO | Hg |
| $NaClO_3$ | 10 | 100 | 7 | 4 | 3 |
| $NaClO_3$ | 50 | 100 | 6 | 3 | 0 |
| $Ca(OCl)_2$ | 10 | 99 | 3 | 2 | 56 |
| $KMnO_4$ | 20 | 100 | 34 | 33 | 100 |
| $H_2O_2$ | 10 | 100 | 5 | 2 | 0 |
| $H_2O_2$ | 10 | 100 | 6 | 3 | 3 |
| $H_2O_2$ | 50 | 99 | 5 | 4 | 0 |
| $NaClO_2$ | 2.5 | 100 | 62 | 36 | 95 |

*oxidant concentration in a 10 wt % $CaCO_3$ slurry

Of the initial oxidants tested only the potassium permanganate ($KMnO_4$), the sodium chlorite ($NaClO_2$) and the calcium hypochlorite [$Ca(OCl)_2$] showed significant Hg removal, at 100%, 95% and 56% respectively. The $KMnO_4$ and $NaClO_2$ showed encouraging $NO_X$ removal at 34% and 62% respectively.

Example 2

To determine the influence of $NaClO_2$ on pollutant removal in the experimental conditions, a second set of baseline tests were done with $NaClO_2$ solutions in the absence of $CaCO_3$. The tests were conducted using $NaClO_2$ concentrations of 2.5 mM and 8.8 mM in the additive solution (the oxidizer solution plus a de-ionized water solution in lieu of the CaCO3 slurry). The results are given in Table 3.

TABLE 3

REMOVAL OF POLLUTANTS (% AT 1 HR) IN BASELINE BENCH-SCALE TESTS.

| Slurry | $ClO_2^-$ Conc'n, [mM] | Pollutant Removal (% at 1 hr) | | | |
|---|---|---|---|---|---|
| | | $SO_2$ | NO | $NO_x$ | Hg |
| DI water (no $CaCO_3$) | 0 | 24 | <2 | <2 | 0 |
| $CaCO_3$ slurry | 0 | 100 | <2 | <2 | 0 |
| DI water (no $CaCO_3$) | 2.5 | 66 | 26 | 19 | 79 |
| DI water (no $CaCO_3$) | 8.8 | 100 | 70 | 38 | 100 |

Sodium chlorite showed good properties as an oxidizer of NO and $Hg^0$ and also as a sorbent for $NO_X$, which is consistent with above mentioned papers. The solution also improved the removal of $SO_2$ over that of the DI water blank.

Example 3

Figure 6:
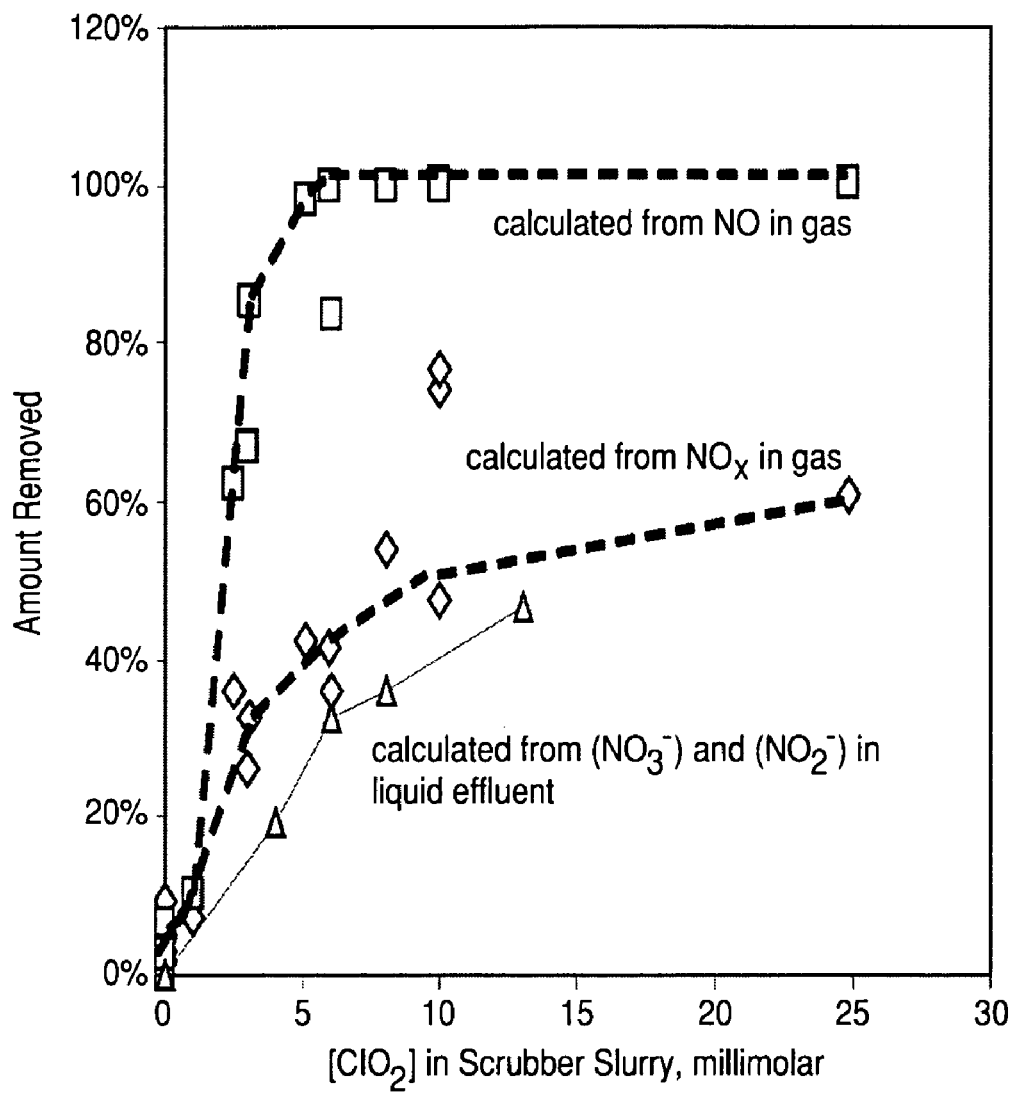
FIG. 6 is an illustrative graph showing the amount of NO and NOx removed from a flue gas as a function of chlorite concentration in a $CaCO_3$ slurry.

A range of sodium chlorite concentrations was tested. Four selected sodium chlorite concentrations, effluent samples were collected during the final 10 minutes of the experiments for total Hg and anion analysis. In all cases, the $SO_2$ removal was at or near 100%. The results for NO oxidation and $NO_X$ ($NO_2$) removal are shown in FIG. 6. The concentration of nitrogen species—nitrate and nitrite anions—in the scrubber effluent was used to calculate a nitrogen mass balance. This is also included in FIG. 6. One can see that small additions of the chlorite (approx 5.0 mM) result in nearly complete oxidation of the NO to $NO_2$. The $NO_2$ scrubbing increased with increasing chlorite addition, ranging from about 40% at 5.0 mM $NaClO_2$ up to about 60% at 25.0 mM $NaClO_2$ in the added slurry. The nitrogen species in the slurry (the nitrate and nitrite) was consistent with the scrubbing of the $NO_2$ from the gas stream.

Figure 7:
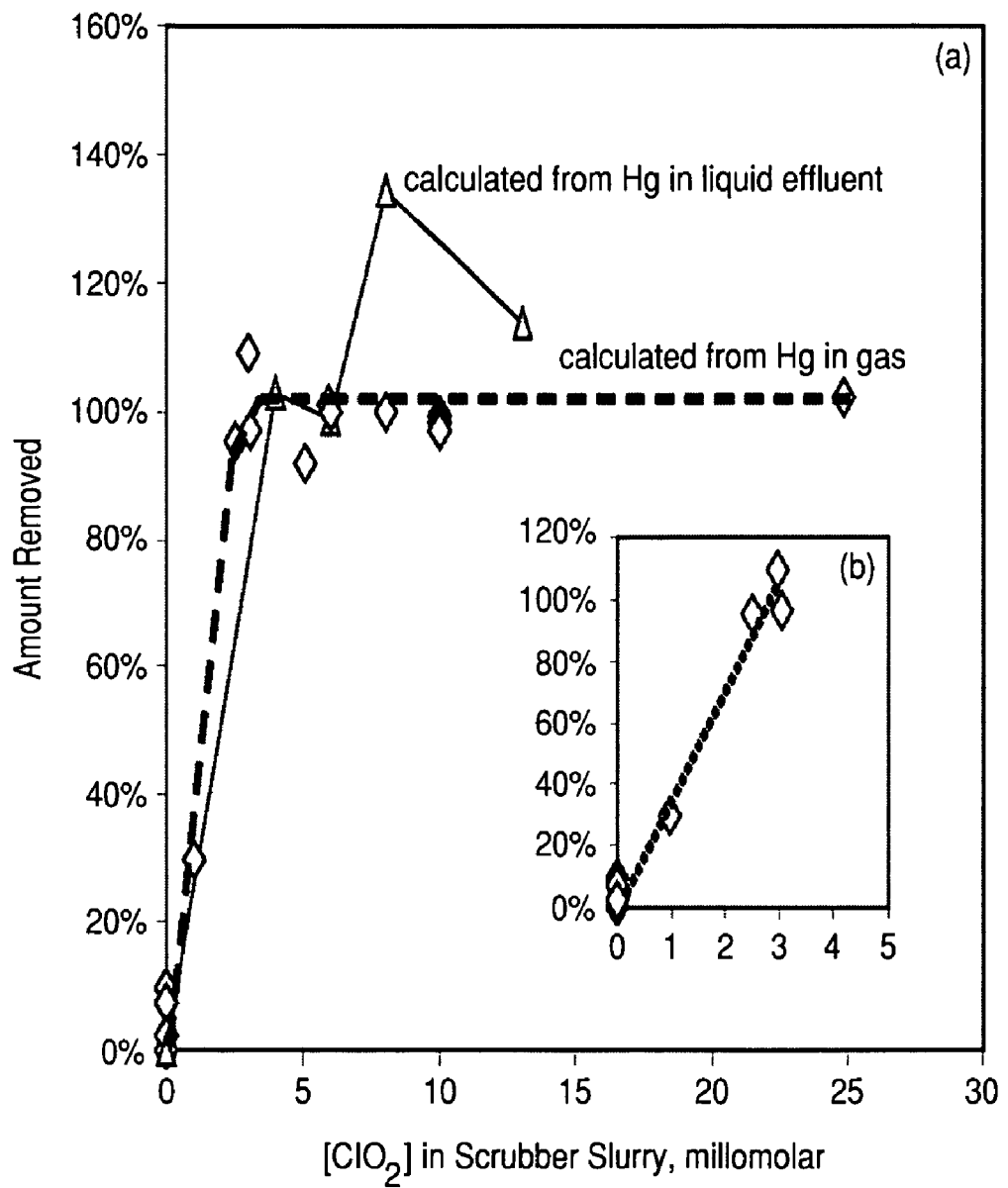
FIG. 7 is an illustrative graph showing the amount of $Hg^0$ removed as a function of chlorite concentration in a $CaCO_3$ slurry is shown in FIG. 7(*a*). The lower region, showing a linear response to [$ClO_2$—] is shown in FIG. 7(*b*).

The removal of $Hg^0$ as a function of chlorite concentration in the scrubber slurry is shown in FIG. 7. The initial concentration of Hg in the scrubber inlet was 206 μg/m3. Initial concentrations of NO and SO2 were 200 ppm and 1500 ppm, respectively.

Nearly 100% Hg removal was seen at $NaClO_2$ additions as low as 3.0 mM. A mass balance from the measurement of total Hg in the scrubber effluent is also shown in FIG. 7. The inserted plot in FIG. 7 shows that the amount removed (%) is linear with the amount of $ClO_2^-$ in the scrubber slurry up to 3.0 mM.

Example 4

Figure 8:
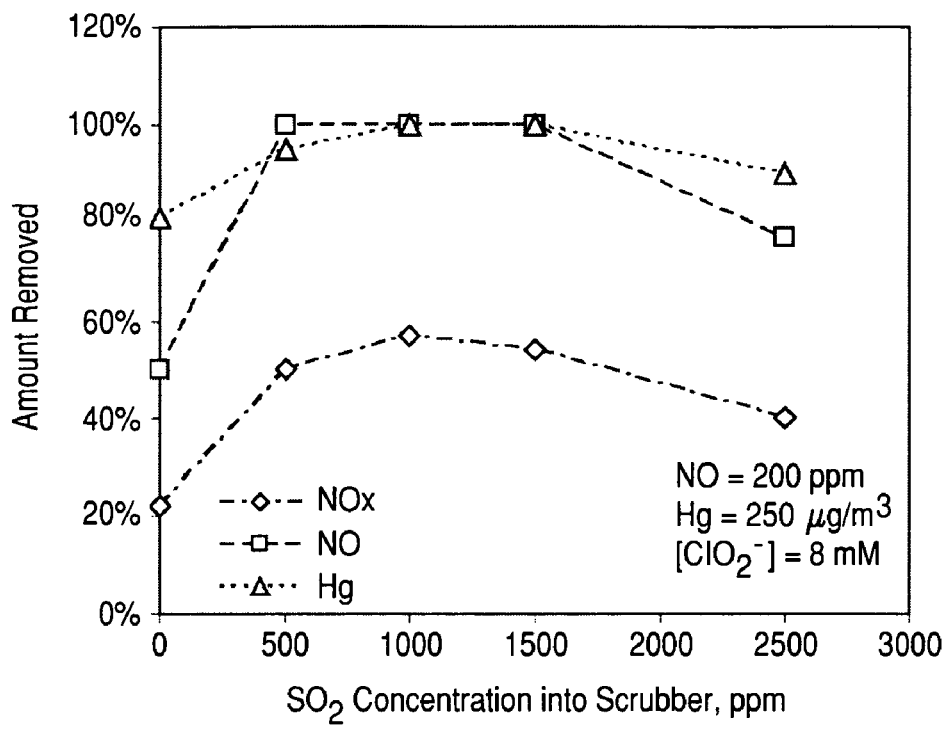
FIG. 8 is an illustrative graph showing the effect of $SO_2$ concentration in the flue gas stream on the removal of other pollutants.

In order to evaluate the role that the concentrations of $SO_2$ has on the effectiveness of the sodium chlorite additive, a series of tests were conducted with varying $SO_2$ concentrations from 0-2500 ppm while maintaining all other parameters at standard conditions. A similar series to determine the effect of $NO_X$ was conducted with varying NO concentrations from 0-470 ppm. In each of these tests the added slurry contained 10 wt % $CaCO_3$ and 8.0 mM $NaClO_2$. In the first series, the $SO_2$ concentration in the entering gas was varied from 0 to 2500 ppm. The results are given in FIG. 8. The amount of $NaClO_2$ added was 8 mM. The entering concentrations of $Hg^0$ and NO were held constant for all tests. The oxidant was less effective in the absence of $SO_2$. Oxidation of NO was only about 50% in the absence of $SO_2$ in the simulated flue gas. This increased to nearly 100% with the addition of 500 ppm $SO_2$ and was consistent until dropping to approximately 75% oxidation when the $SO_2$ was increased to 2500 ppm. The $NO_X$ ($NO_2$) scrubbing followed a similar pattern with lower scrubbing with no $SO_2$ addition, an increase with $SO_2$ addition and then a decline at the highest $SO_2$ addition. Mercury oxidation and removal was also affected by the presence of $SO_2$. In the case of 0 ppm $SO_2$ in the flue gas, the Hg oxidation and removal was about 80%. Like the NO, the Hg oxidation and removal increased to nearly 100% with the addition of 500 ppm $SO_2$ and remained constant until the addition of 2500 ppm $SO_2$.

Figure 9:
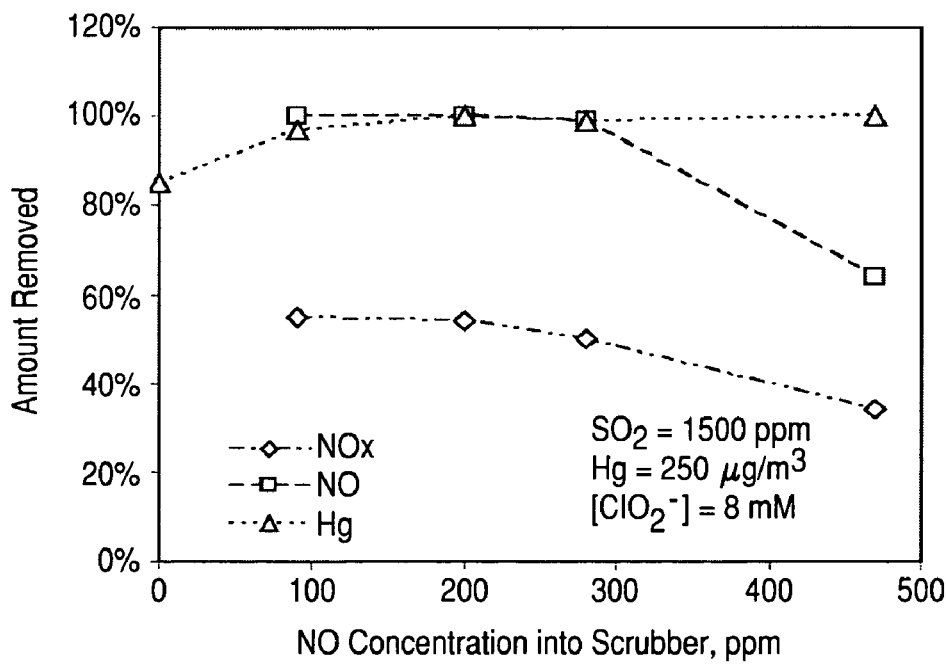
FIG. 9 is an illustrative graph showing the effect of NO concentration in the flue gas stream on the removal of other pollutants.

The results for the tests involving varying concentrations of NO are shown in FIG. 9. The inlet concentration of NO was 200 ppm. The initial SO2 concentration was 1500 ppm.

The Hg oxidation was less affected by the concentration of NO in the flue gas. At 0 ppm NO, the Hg oxidation and removal was about 82%. This increased to nearly 100% for all subsequent test conditions with increasing NO concentrations. The NO oxidation was nearly 100% at NO concentrations ranging from 100-300 ppm. The NO oxidation then dropped sharply down to about 65% at 470 ppm NO. The $NO_X$ (e.g., $NO_2$) removal showed a similar pattern as the NO. In all cases (i.e., both varying concentrations of $SO_2$ and NO), it seems that the $NO_X$ removal is consistently about 50% of the NO oxidation. In all case where $SO_2$ was present, the removal was consistently nearly 100%.

Figure 10:
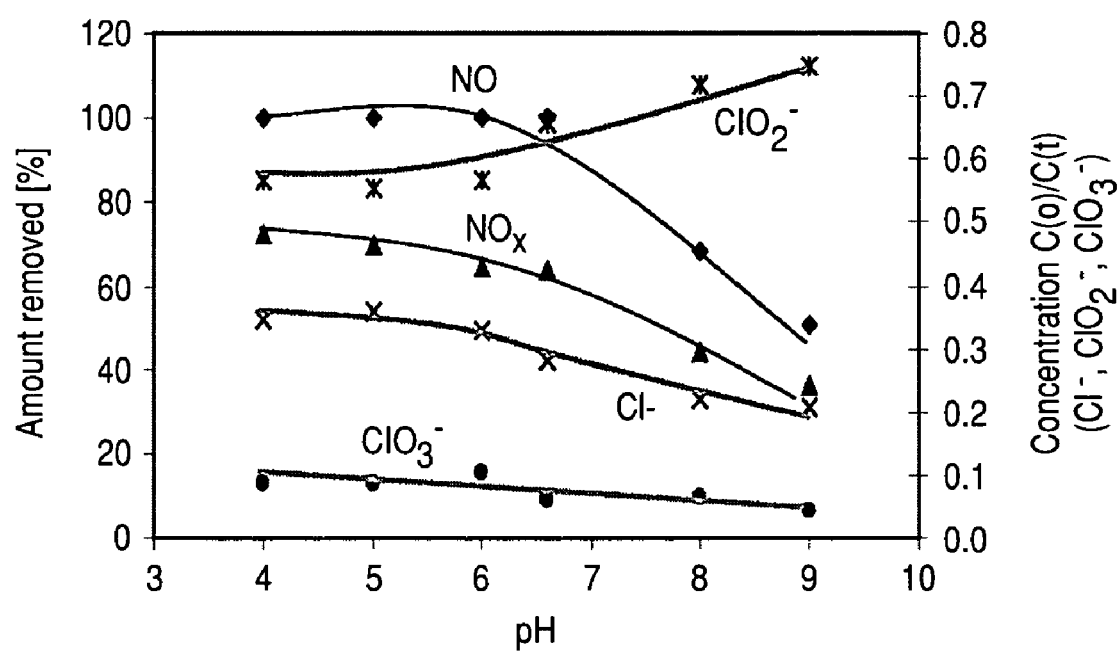
FIG. 10 is an illustrative graph showing the amount of NO and NOx removed as a function of pH of the reaction solution and distribution of chlorine species in the effluent.
Figure 11:
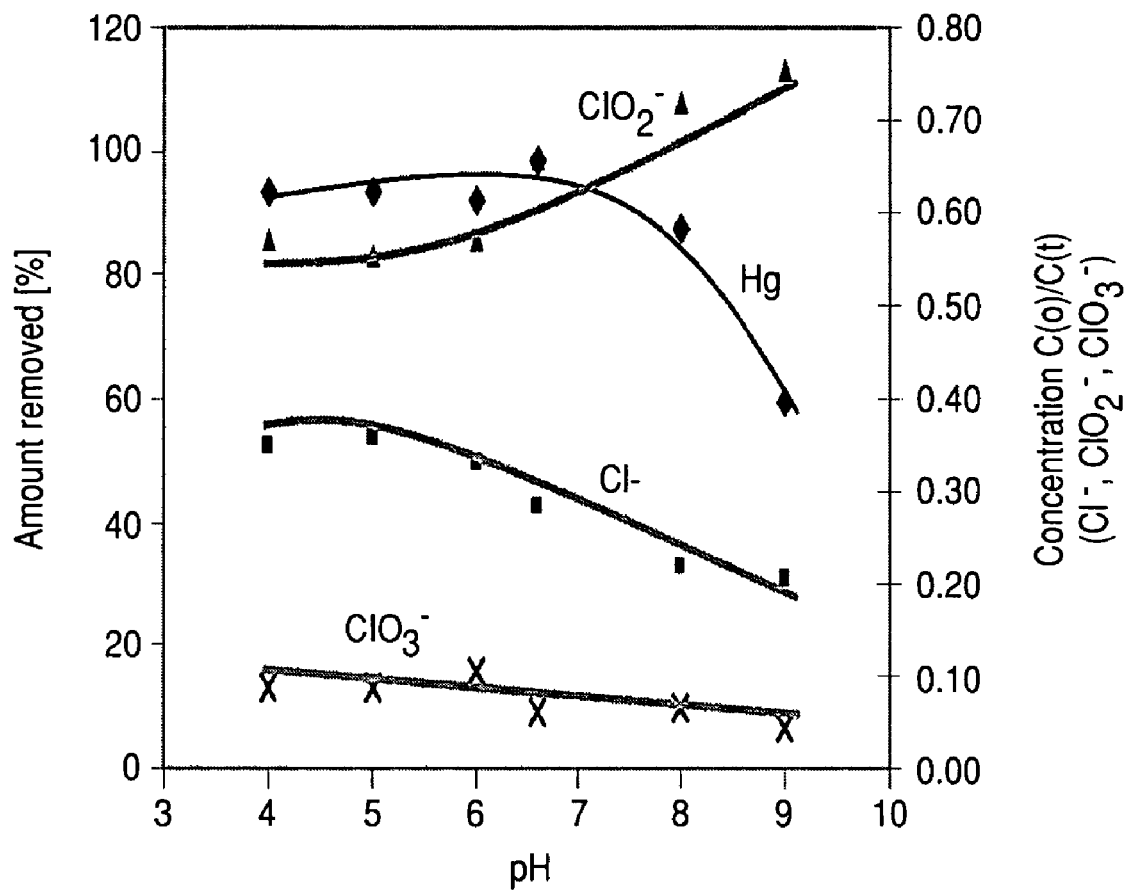
FIG. 11 is an illustrative graph showing the amount of Hg removed as a function of pH of the reaction solution and distribution of chlorine species in the effluent.

FIG. 10 shows the amount of NO and NOx removed as a function of pH of the reaction solution and distribution of chlorine species in the effluent. FIG. 11 is a graph illustrating the amount of Hg removed as a function of pH of the reaction solution and distribution of chlorine species in the effluent.

BACKGROUND OF EXAMPLES 5-7

A countercurrent packed column was used to simulate a wet FGD scrubber system. The countercurrent column contained a packing to facilitate slurry turbulence and promote intimate contact between the gas stream and scrubbing slurry to improve the pollutant removal efficiencies. The countercurrent packed column had a gas inlet for the gas stream, and four inlets each for introduction of the alkaline slurry and the oxidizing agent solution. This design allowed the alkaline slurry and/or oxidizing agent solution to be introduced into the countercurrent packed column at residence time intervals of 0.5 seconds, 1.0 second, 1.5 seconds, and/or 2.0 seconds. The resulting spent slurry was directed to a forced oxidation tower to convert $CaSO_3$ to $CaSO_4$, as described earlier.

The system included a gas blending system for providing a synthetic flue gas, the countercurrent packed column, and gas analyzers to measure the amount of pollutants in the gas stream as the gas stream passes through the countercurrent packed column.

Example 5

The $CaCO_3$ slurry and an oxidizing agent solution were introduced into the countercurrent packed column at introduction points along the countercurrent packed column that allowed the resulting slurry mixture (CaCO3+aqueous oxidizing agent solution) to contact the gas stream at column residence times of 0.5 seconds, 1.0 second, 1.5 seconds, and 2.0 seconds. The inlet concentration of NO in the simulated flue gas was 200 ppm. The initial $SO_2$ concentration was 1500 ppm. The concentration of the oxidizing agent ($NaClO_2$) was 3 mM. The alkaline slurry was a 10% $CaCO_3$ aqueous solution. The inlet concentration of NO and Hg were approximately 200 ppmv and 206 $\mu g/m^3$, respectively.

Figure 12:
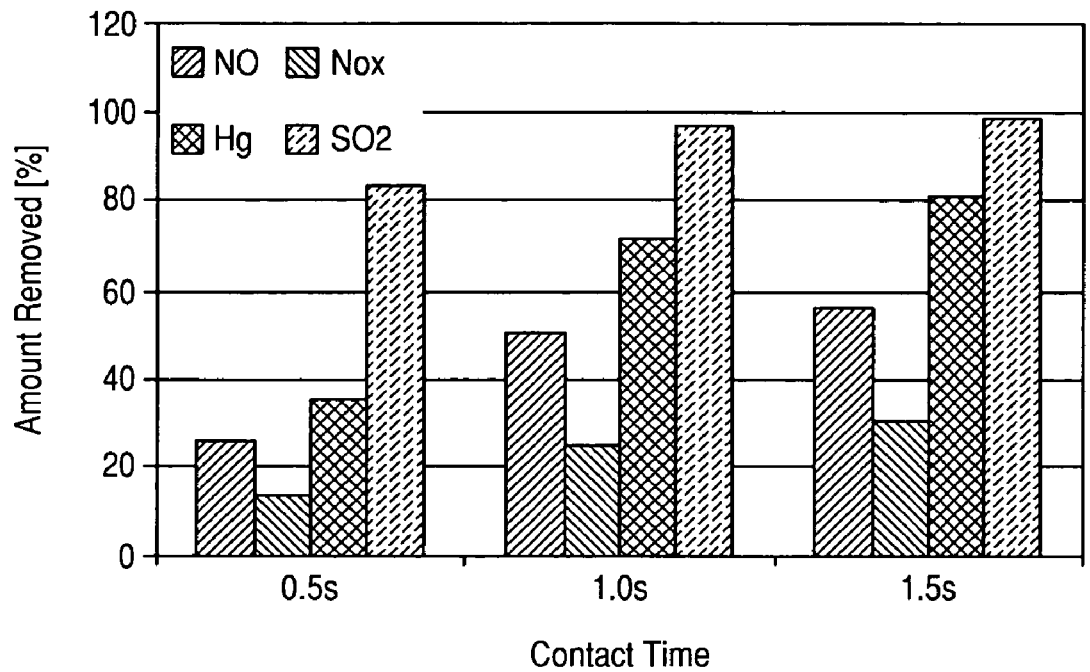
FIGS. 12 and 13 are illustrative graphs showing the results that are obtained when an oxidizing agent and alkaline slurry are added at different residence times in the scrubber.

FIG. 12 is a graph showing the results that were obtained when the oxidizing agent solution and the alkaline slurry were simultaneously introduced into the countercurrent packed column at the same location (i.e., with the same column residence time, as shown in FIG. 12).

Example 6

A $CaCO_3$ slurry was fed into the countercurrent packed column at the inlet corresponding to a 0.5 second column residence time. The $NaClO_2$ aqueous solution was then introduced into the countercurrent packed column at locations corresponding to 0.5 s, 1.0 s and/or 1.5 s column residence time (i.e., at locations higher on the packed column). The inlet concentration of NO was 200 ppm. The initial $SO_2$ concentration was 1500 ppm. The concentration of $NaClO_2$ was 3 mM. The $CaCO_3$ was in a 10% slurry. The inlet concentration of NO and Hg were approximately 200 ppmv and 206 $\mu g/m^3$, respectively.

Figure 13:
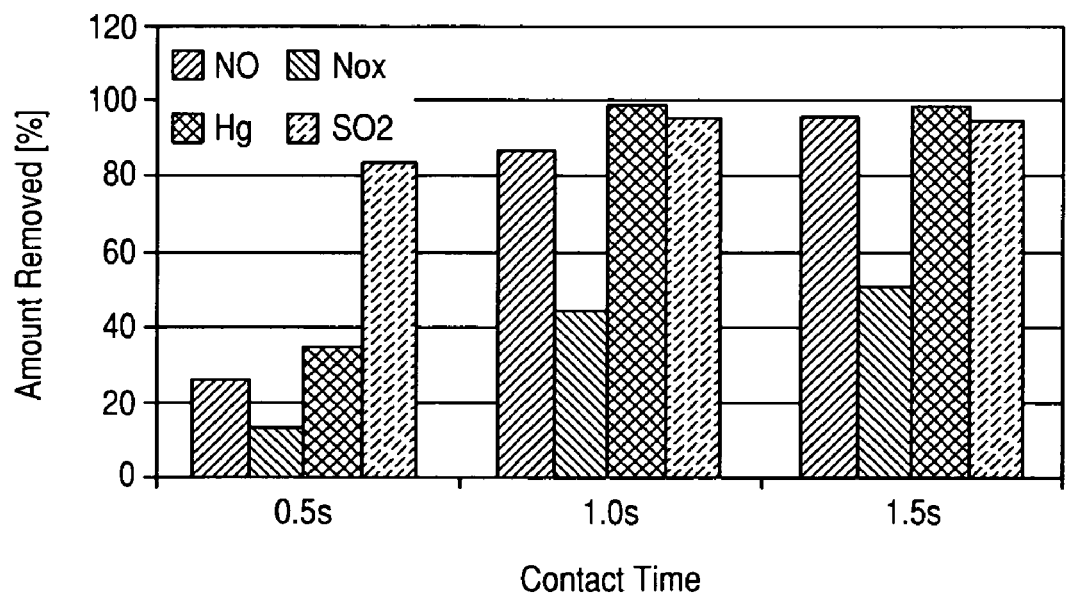

FIG. 13 is a graph showing the results that are obtained when the oxidizing agent solution is introduced at locations after introduction of the alkaline slurry. In this case, the $CaCO_3$ slurry was introduced, in each test, at a column residence time of 0.5 second. The oxidizing agent solution was introduced at varying locations corresponding to column residence times of 0.5 s, 1.0 s, and 1.5 s.

Comparison of the results shown in FIGS. 12 and 13 indicate an enhanced performance when the oxidizing agent slurry is introduced after the alkaline slurry—so that the $SO_2$ is mostly scrubbed from the gas stream when it contacts the oxidizing agent.

Example 7

Figure 14:
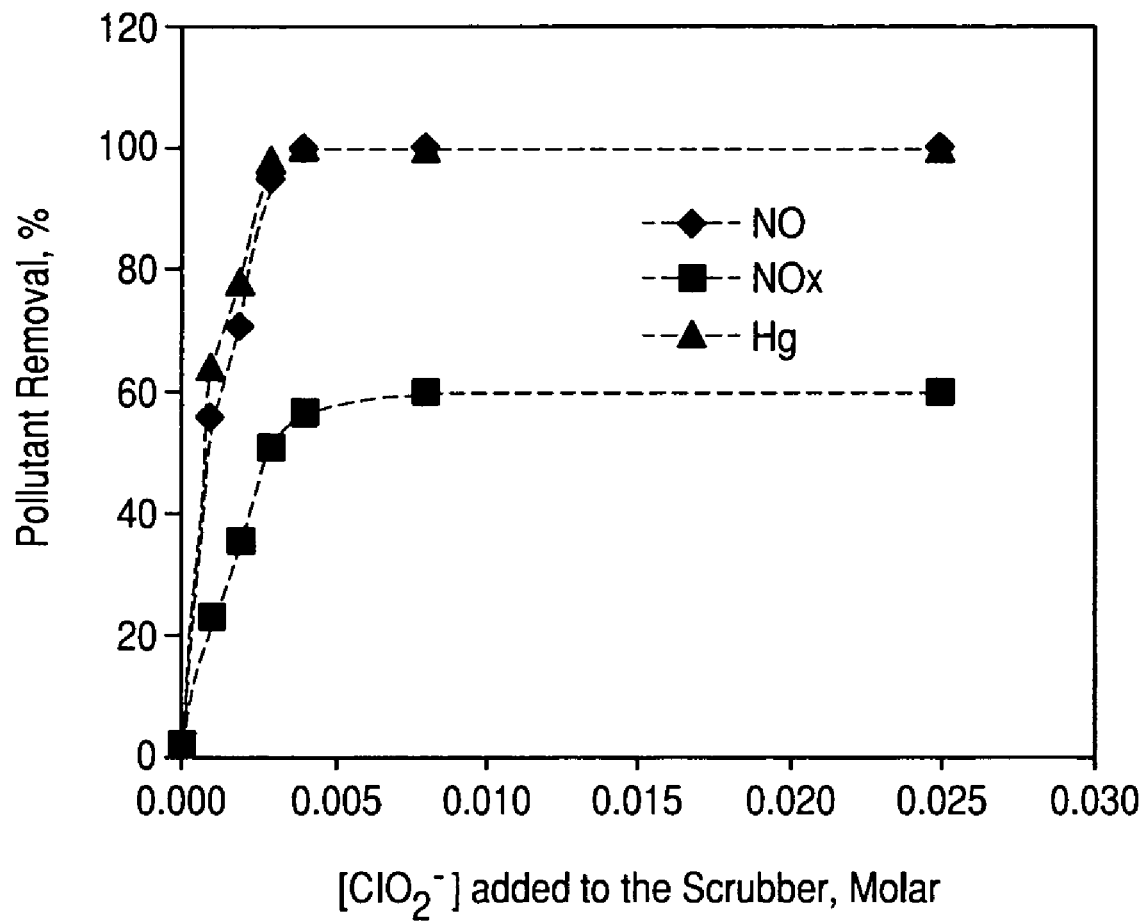
FIG. 14 shows the results of air pollutant removal when the oxidizing agent is introduced after the alkaline slurry.

Air pollutant removal results obtained by injecting various concentrations of $NaClO_2$ at the inlet corresponding to a column residence time of 1.5 s, while the $CaCO_3$ slurry was injected at the inlet port corresponding to a column residence time of 0.5 s. The inlet concentration of NO was 200 ppm. The initial $SO_2$ concentration was 1500 ppm. The $CaCO_3$ slurry was a 10% aqueous solution. The inlet concentration of NO and Hg were approximately 200 ppmv and 206 $\mu g/m^3$, respectively. The results are set forth in FIG. 14.

What is claimed:

1. A process for removing $SO_2$ and $Hg^0$ vapor from a gas stream, comprising contacting the gas stream with an alkaline slurry and an oxidizing agent to remove the pollutants from the gas stream, and
    wherein the alkaline slurry contacts the gas stream at the same time the oxidizing agent contacts the gas.
2. The process according to claim 1, wherein the gas stream is an industrial process or flue gas containing $SO_2$, NO, $NO_2$ and $Hg^0$ vapor.
3. The process according to claim 2, wherein the flue gas is flowing through a flue gas desulfurization (FGD) apparatus.
4. The process according to claim 1, wherein the oxidizing agent is an aqueous solution selected from the group consisting of water soluble oxidizing salts, water soluble halide containing salts, $NaClO_2$, $NaClO_3$, $H_2O_2$, $KMnO_4$, and $Ca(OCl)_2$.

5. The process according to claim 4, wherein the oxidizing agent is an aqueous solution of $NaClO_2$.

6. The process according to claim 1, wherein the alkaline slurry is an aqueous slurry of an alkaline or alkaline earth hydroxide, an alkaline earth oxide, an alkaline or alkaline earth carbonate, lime (CaO), limestone, calcium carbonate ($CaCO_3$), or mixtures thereof.

7. The process according to claim 1, wherein the oxidizing agent is an aqueous solution selected from the group consisting of water soluble oxidizing salts, water soluble halide containing salts, $NaClO_2$, $NaClO_3$, $H_2O_2$, $KMnO_4$, and $Ca(OCl)_2$, and wherein the alkaline slurry is an aqueous slurry of an alkaline or alkaline earth hydroxide, alkaline or alkaline earth hydroxide, alkaline or alkaline earth oxide, alkaline or alkaline earth carbonate, lime, limestone, calcium carbonate, or mixtures thereof.

8. The process according to claim 1, comprising simultaneously removing the air pollutants $SO_2$, $NO_x$ and $Hg^0$ vapor from a gas stream in a flue gas desulfurization (FGD) by contacting the gas stream with an alkaline slurry and an oxidizing agent, and
wherein x is 1 or 2.

9. The process according to claim 1, wherein the gas stream comprises $SO_2$, NO, $NO_2$, and $Hg^0$ vapor.

10. The process according to claim 1, wherein the gas comprises $SO_2$, $NO_x$, and $Hg^0$ vapor.

11. An apparatus for scrubbing a gas stream comprising $SO_2$ and at least one pollutant selected from the group consisting of $NO_x$ and Hg vapor, comprising:
  i) a holding tank for an alkaline slurry;
  ii) a holding tank for an aqueous solution of an oxidizing agent;
  iii) a spray tower having one or more contact zones;
  iv) one or more alkaline slurry introduction points along the spray tower; and
  v) one or more oxidizing agent introduction points along the spray tower, wherein the one or more alkaline slurry introduction points and the one or more oxidizing agent introduction points are positioned along the spray tower so that the gas stream is contacted with the alkaline slurry and oxidizing agent in a contact zone to obtain a reacted gas;
  vi) a forced oxidation device for treating alkaline slurry that has been in contact with the gas stream; and
  vii) an exhaust downstream from the contact zone for releasing the reacted gas, wherein the reacted gas emanating from the exhaust has been scrubbed of $SO_2$ and at least one pollutant selected from the group consisting of $NO_x$, and $Hg^0$ vapor,
and wherein x is 1 or 2.

12. The apparatus according to claim 11, wherein the one or more alkaline slurry introduction points and the one or more oxidizing agent introduction points are positioned within the contact zone of the spray tower.

13. The apparatus according to claim 12, wherein the one or more alkaline slurry introduction points and the one or more oxidizing agent introduction points are positioned along the spray tower at the same location so that the alkaline slurry contacts the gas stream at the same time the oxidizing agent contacts the gas.

14. The apparatus according to claim 12, wherein the one or more alkaline slurry introduction points and the one or more oxidizing agent introduction points are positioned along the spray tower at different locations so that the alkaline slurry contacts the gas stream before the oxidizing agent contacts the gas stream.

15. The apparatus according to claim 11, further comprising a pump or sprayer to deliver the alkaline slurry into the spray tower.

16. The apparatus according to claim 11, further comprising a pump or sprayer to deliver the oxidizing agent into the spray tower.

17. The apparatus according to claim 11, further comprising one or more pumps or sprayers to deliver the oxidizing agent and/or alkaline slurry into the spray tower, and
wherein the pump or sprayer evenly delivers the oxidizing agent and/or alkaline slurry within the spray tower.

18. The plant that produces a gas comprising at least one pollutant, comprising the apparatus according to claim 11.

19. A plant that produces a gas comprising at least one pollutant, comprising the apparatus according to claim 14.

* * * * *